Jan. 5, 1960     E. A. WACHSMUTH     2,919,685
APPARATUS FOR THE STABILIZATION OF FREE-PISTON MACHINES
Filed Aug. 24, 1955     6 Sheets-Sheet 1

Inventor:
Erich A. Wachsmuth,
by Louis A. Maxson
Attorney.

Jan. 5, 1960   E. A. WACHSMUTH   2,919,685
APPARATUS FOR THE STABILIZATION OF FREE-PISTON MACHINES
Filed Aug. 24, 1955   6 Sheets-Sheet 2

Inventor:
Erich A. Wachsmuth.
by Louis A. Waxom.
Attorney.

Jan. 5, 1960   E. A. WACHSMUTH   2,919,685
APPARATUS FOR THE STABILIZATION OF FREE-PISTON MACHINES
Filed Aug. 24, 1955   6 Sheets-Sheet 3

Inventor:
Erich A. Wachsmuth.
by Louis A. Maxson,
Attorney.

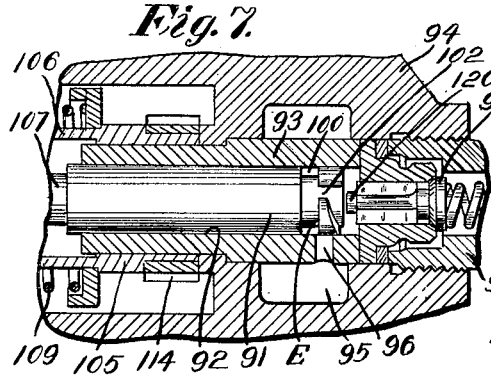
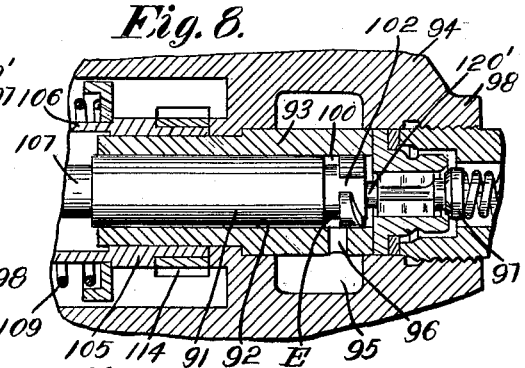
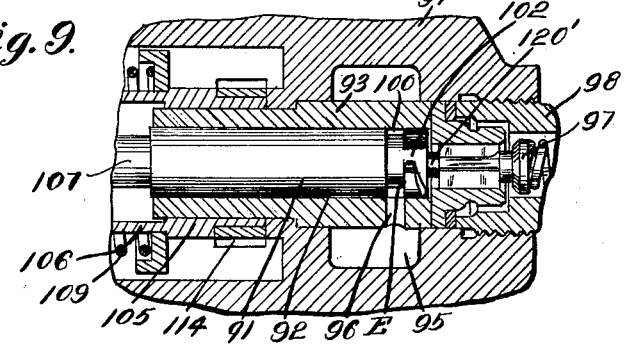
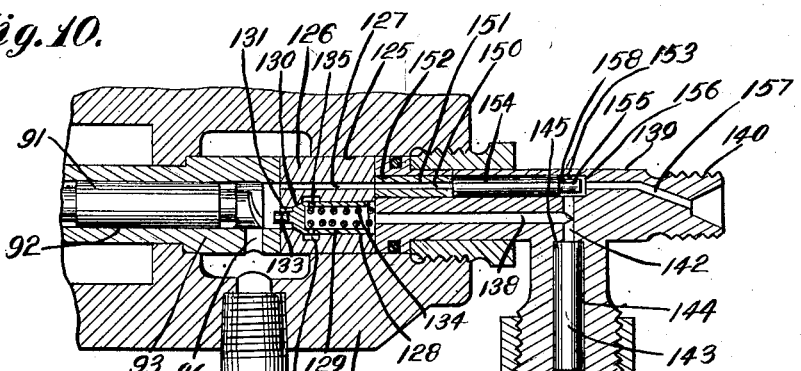
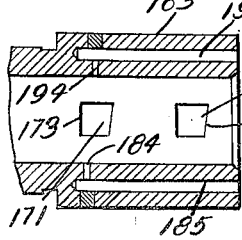
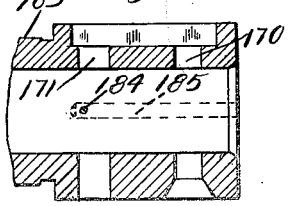

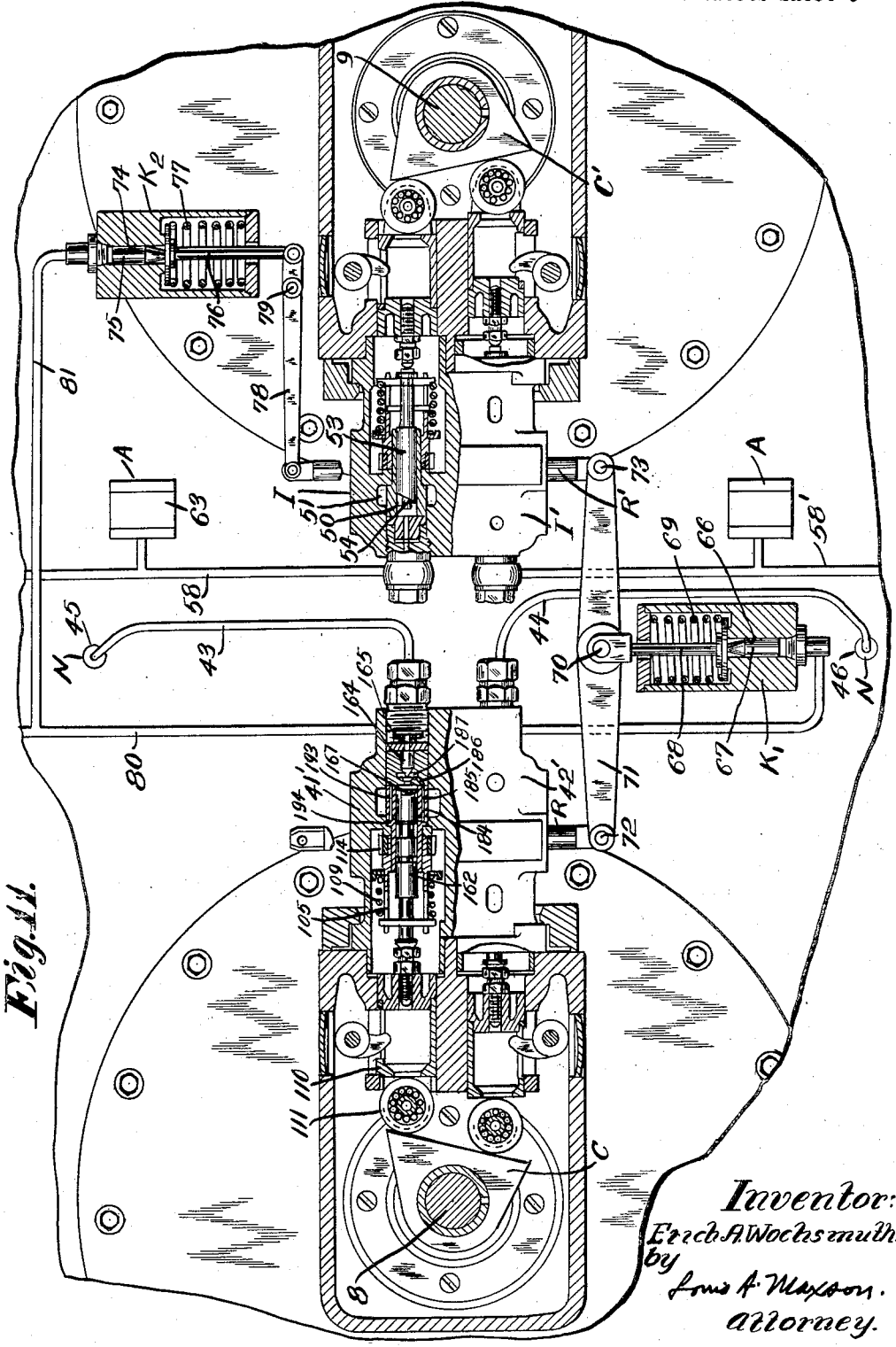

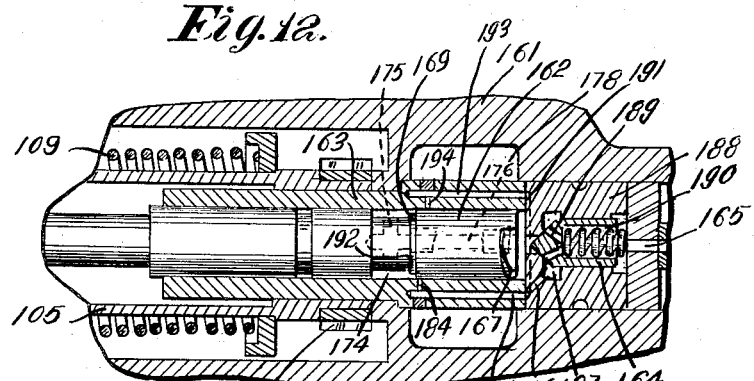
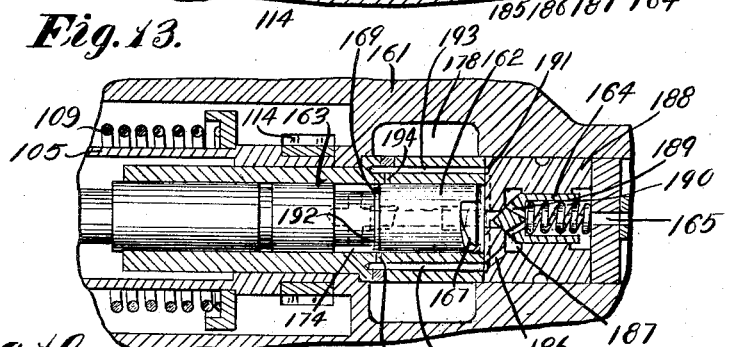
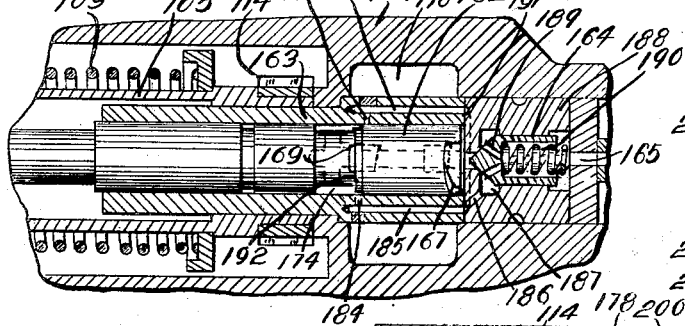
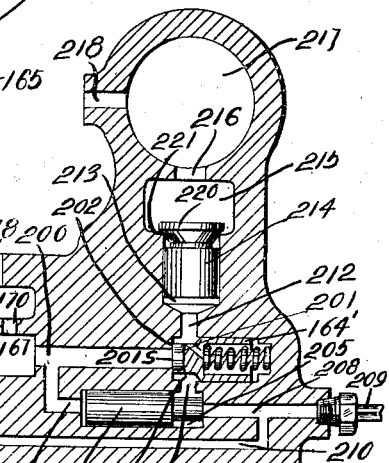
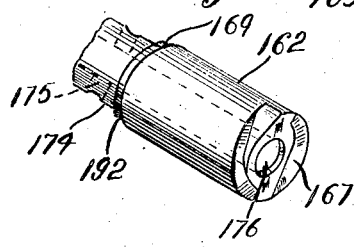

United States Patent Office 2,919,685
Patented Jan. 5, 1960

2,919,685

APPARATUS FOR THE STABILIZATION OF FREE-PISTON MACHINES

Erich A. Wachsmuth, Michigan City, Ind., assignor to Joy Manufacturing Company, Pittsburgh, Pa., a corporation of Pennsylvania Application August 24, 1955, Serial No. 530,246

18 Claims. (Cl. 123—46)

This invention relates in a primary aspect to free-piston, internal combustion engine-driven compressors, and more particularly to apparatus for stabilizing the operation of such machines. More especially, from this aspect, the invention relates to apparatus for stabilizing machines of the character mentioned in which two opposed-piston systems are arranged and connected in counterstroke relation to each other, i.e. with the pistons of one system traveling in the opposite direction to the corresponding pistons of the other system. From another aspect it relates to improvements in fuel injection apparatus for internal combustion engines. Other aspects may hereinafter be noted.

The stabilizing of free-piston machines of the type in which two motor-compressor units, each of the opposed-piston type, are coupled together, for example mechanically or hydraulically, in such relation to each other that the reciprocating elements of one unit make their working strokes while the reciprocating elements of the other unit are moved through their opposite strokes, is more difficult than the stabilizing of a free-piston mechanism which comprises but one pair of motor-compressor pistons. The necessity which characterizes all free-piston machines, that there be a balance within each stroke between the energy available for drive and the energy absorbed by the compressor, is particularly critical in machines embodying two motor-compressor units as above mentioned, in view of the but slight differences in stroke length which are permissible with such machines.

In contrast with machines which comprise but one pair of motor-compressor pistons, in which machines, independent of the load condition of the machine, each time there is an excess of energy in the motor, it is automatically used up in useful work in the compressor, with resultant immediate reduction in the energy available for effecting the return piston stroke which effects compression in the motor (whereby the tendency of such machines to run away is overcome or at least greatly reduced), in machines of the two-opposed-piston-systems-type each excess of energy in the motor end—and this is particularly so during running without load—leads, under a constant increase of the stroke, to a rapid increase in the rate of operation, and, as a result, these machines have a tendency to instability. Such an excess of motor energy can result from a change in load upon the machine while it is running, with the result that the characteristic of fuel injection pumps of the groove-controlled type to increase the injection pressure as the frequency of injections increases, makes the machine still more unstable when such pumps are used.

The present invention solves the stabilizing problem of such machines in a simple manner—namely that—independent of the load condition of the machine—upon each exceeding of the normal stroke of the working piston the pressure line system of the fuel injection pump is more or less relieved, depending upon the amount of overstroking, in such a manner that, without change in the displacement of the fuel pump, the quantity of fuel delivered to the motor is diminished as the motor piston stroke increases.

The relieving mentioned may desirably be effected inside the injection pump itself, as by the employment of the pump plunger itself as an impulse giver, for example to the pump discharge valve, or by the provision of a small hole connected with the system behind (beyond) the delivery (pump discharge) valve and maintained closed by the pump plunger as long as the machine is not exceeding its minimum stroke, but adapted, when the minimum stroke is exceeded, to permit the escape of a closely controlled amount of fuel to the suction chamber of the pump, the amount so escaping regulated by the degree of plunger movement beyond that which corresponds to minimum stroke.

In the practice of the invention it is desirable that there be used an injection system which normally works without, or with only a slight, relief of the pressure within the system at the end of fuel discharge, for example, the employment of a pressure valve without any special relief device (as, for example, a relief piston) and the use of an injection nozzle causing either no—or only a slight—relief wave.

The next item here to be noted can most readily be appreciated if a series of definitions be attempted. Accordingly the term "normal stroke" will be adopted to designate that stroke which is relatively constantly maintained when the machine is operating under a relatively constant load and with the deviations from normal air demand at a minimum so that receiver pressure remains relatively constant. "Maximum stroke" will be used to indicate that stroke, greater than normal stroke, beyond which, in a given design, there might occur mechanical engagement of the relatively reciprocable chamber-forming or bounding parts of the machine. And "minimum stroke" will be employed to identify that stroke length below which, under normal load, the apparatus would not maintain operation.

Now it may be seen that there are at least two possibilities. There may be automatic regulation of stroke length operative only when "normal" stroke length is exceeded; and there may be automatic regulation which extends throughout the whole range of variation in stroke length from "minimum" to "maximum." The second is the more advantageous in that it will not only diminish the injected amount of fuel caused by overstroke (stroke above "normal") but also increase the amount of injected fuel beyond its normal amount in case of understroke (stroke less than "normal") The first type of automatic regulation is valuable, in that it diminishes the fuel in case of overstroke, but, since "normal" stroke always has to be bigger than "minimum" stroke, an ideal working stabilization device will increase the amount of injected fuel in the case of understroke as well as diminish the fuel in case of overstroke.

As has been suggested above, automatic regulation may very readily be effected through mechanical coaction between the fuel pump plunger and the pump discharge valve.

When the automatic regulation is to be effected only above "normal stroke," the increase in the stroke of the pump plunger which attends the exceeding by the motor piston of "normal" stroke may be caused to push open— reopen—the fuel pump discharge valve which had already closed, whereby there may be a relief of the still-under-pressure conduit system between the fuel injection pump and the nozzle, back towards the working chamber of the pump, which chamber is vented at the end of the pumping stroke. The extent of the thus-effected relief can be influenced by appropriate choice of the injection nozzle, the selection of nozzle opening and closing pressures, the suitable determination of the volume of the conduit beyond the fuel injection pump discharge valve, and by the provision of a check valve suitably arranged in the conduit between the fuel injection pump and the nozzle. The coaction between the fuel pump plunger and the discharge valve, when control of the latter is the expedient resorted to in the practice of the invention, may be accomplished through the use of a thrust pin, preferably integral either with the pump discharge valve or the pump plunger, and when above-"normal" automatic regulation only is to be effected by such arrangement, of such length that upon exceeding of the "normal" stroke of the pump plunger it unseats and pushes open the pump discharge valve.

It is advisable in order to effect regulation of the quantity of fuel pumped while the apparatus is partially loaded, to use an injection pump with variable commencement but with termination-fixed fuel displacement. In an appropriately designed pressure supply system, such a pump, with its discharge of fluid on each stroke ending at a fixed point near the dead point of the unit, regardless of the injection pressure, makes possible, when the machine is operating unloaded, the continuation of injection, in small quantities, of fuel beyond the normal dead point of the machine. Accordingly, the commencement of relief during the actual period of injection may reduce the quantity of fuel delivered to the motor, and so the desired decrease in stroke length may be immediately effected.

When the wider range of automatic control previously referred to is desired—as may normally be the case—and it is wished not only to diminish the injected amount of fuel caused by overstroke, but also to increase it beyond its normal amount in case of understroke, this may be accomplished, in an apparatus as just described, by providing a thrust pin of such length that the pump discharge valve begins to be opened mechanically as soon as the piston stroke of the apparatus commences to grow beyond the minimum length at which the machine is able to operate. In an apparatus so arranged, the whole delivered amount of fuel from the fuel pump may vary more or less as follows: at "minimum" stroke, 110% of "normal" fuel consumption; at "normal" stroke, 100% of "normal" fuel consumption, and at "maximum" stroke, 90% of "normal" fuel consumption.

The effecting of stroke regulation by other arrangements than means coacting mechanically with the fuel pump discharge valve is mentioned above. Instead of opening the delivery (pump discharge) valve by the push of the fuel pump plunger, this plunger may be caused to control a small hole connected with the fuel delivering system behind, that is, towards the injection nozzle from, the delivery valve, and having this hole and the plunger so arranged that the hole is closed by the plunger as long as the machine is not exceeding its "minimum" stroke. When that stroke is exceeded, the plunger uncovers the control hole more or less, or for a greater or lesser period, depending on the length of its stroke, which is directly related to the stroke length of the machine. During the periods when the hole is opened, a very closely controlled amount of fuel escapes through the hole to the suction chamber of the pump, whereby it is driven out by the combustion pressure in case an open nozzle is being employed, or by the remaining pressure in the system in case a closed nozzle is being employed. This escaped amount of fuel has to be replaced by the next delivery stroke of the pump plunger before the injection can start, which means that the next injected amount of fuel is smaller by this lost portion.

In view of the hunting characteristic of a control, the position of the control hole will desirably be so located that for the "minimum" stroke with which the machine can operate there will be no discharge of fuel through the hole. For the "normal" stroke the amount of fuel delivered by the pump may be diminished, due partially to the opening of the control hole, on the order of 9%, while the reduction of fuel at "maximum" stroke may reach up to 18%. Accordingly the amount of fuel delivered by the pump is so balanced that in spite of the fuel discharge the compressor and engine are in equilibrium when the machine is operating with its "normal" stroke. Taking the figures last above given and converting them to terms of fuel at normal stroke, there results: at "minimum" stroke, 110% of normal fuel consumption; at "normal" stroke, 100% of normal fuel consumption, and at "maximum" stroke, 90% of normal fuel consumption.

As will hereinafter be explained and illustrated, the different modes of fuel control can be readily embodied in combination with injection pumps of the accumulator type.

Pumps of the type herein disclosed make it possible to extend the injection beyond the piston dead point and have the advantage that the release of fuel in the event of overstroke operates immediately at the injection, that is, while the overstroke is actually occurring, and not two power strokes later.

While in much of what has been said the peculiar advantages of the invention in machines in which two motor-compressor units, each of the opposed piston type, are coupled together so that the reciprocating elements of one unit make their working strokes while the reciprocating elements of the other unit are moved through their opposite strokes, it is not to be supposed that the present invention is without utility in machines which employ but one pair of motor-compressor piston units.

An object of the present invention is to provide an improved stabilization arrangement for free-piston machines of which the loading is variable during operation, and to provide an improved free-piston engine-compressor embodying improved means for maintaining stabilized operation and immediately correcting deviations from such operation. Another object of the invention is to provide an improved motor-compressor, particularly one including two suitably connected motor-compressor systems each comprising two motor-compressor units with the corresponding pistons of the two systems moving oppositely to each other, such motor-compressor incorporating improved means for stabilizing its operation. A further object is to provide an improved fuel pumping apparatus for a fuel injection type of motor. A still further object of the invention is to provide an improved stabilizing apparatus for a free-piston motor operated system in which departures from normal operation are more quickly rectified. Still another object is to provide an improved stabilizing apparatus for a free-piston motor operated system for the prompt correction of overstroking. Yet a further object is to provide an improved stabilizing apparatus for the purpose set forth which shall be effective throughout the entire operating range from "minimum" stroke to "maximum" stroke. Another object is to provide an improved fuel pumping unit for an apparatus of the character described in which automatic stabilizing is effected by features incorporated in the pump, as, for example, means coacting with the pump discharge valve, or in the pump plunger and barrel, or otherwise. As other objects will appear as the invention is described in a number of different illustrative embodiments, there need be no further enumeration of them at this point, and it may simply be noted that other objects and advantages of the invention will hereinafter appear from the ensuing description and appended claims.

In the accompanying drawings, in which several embodiments of the invention in its different aspects are disclosed, Fig. 1 is a somewhat diagrammatic view in central longitudinal section and with some parts in elevation, through a twin motor-compressor in which the invention may be embodied in its more comprehensive aspects and in which in its fuel pump aspects it may be incorporated.

Figs. 7, 8 and 9 are central longitudinal sectional views through a fuel pump very similar in most respects to that of Figs. 2, 3 and 4, but with arrangements for the automatic increase of fuel supply when stroke length is below "normal" as well as for decrease of fuel supply when stroke length exceeds "normal."

In contrast with the disclosures of Figs. 2, 3 and 4 and Figs. 7, 8 and 9, Fig. 10 is a sectional view through an accumulator type pump in which, however, the regulation is still effected through coaction between the pump plunger and pump discharge valve.

Figure 2:
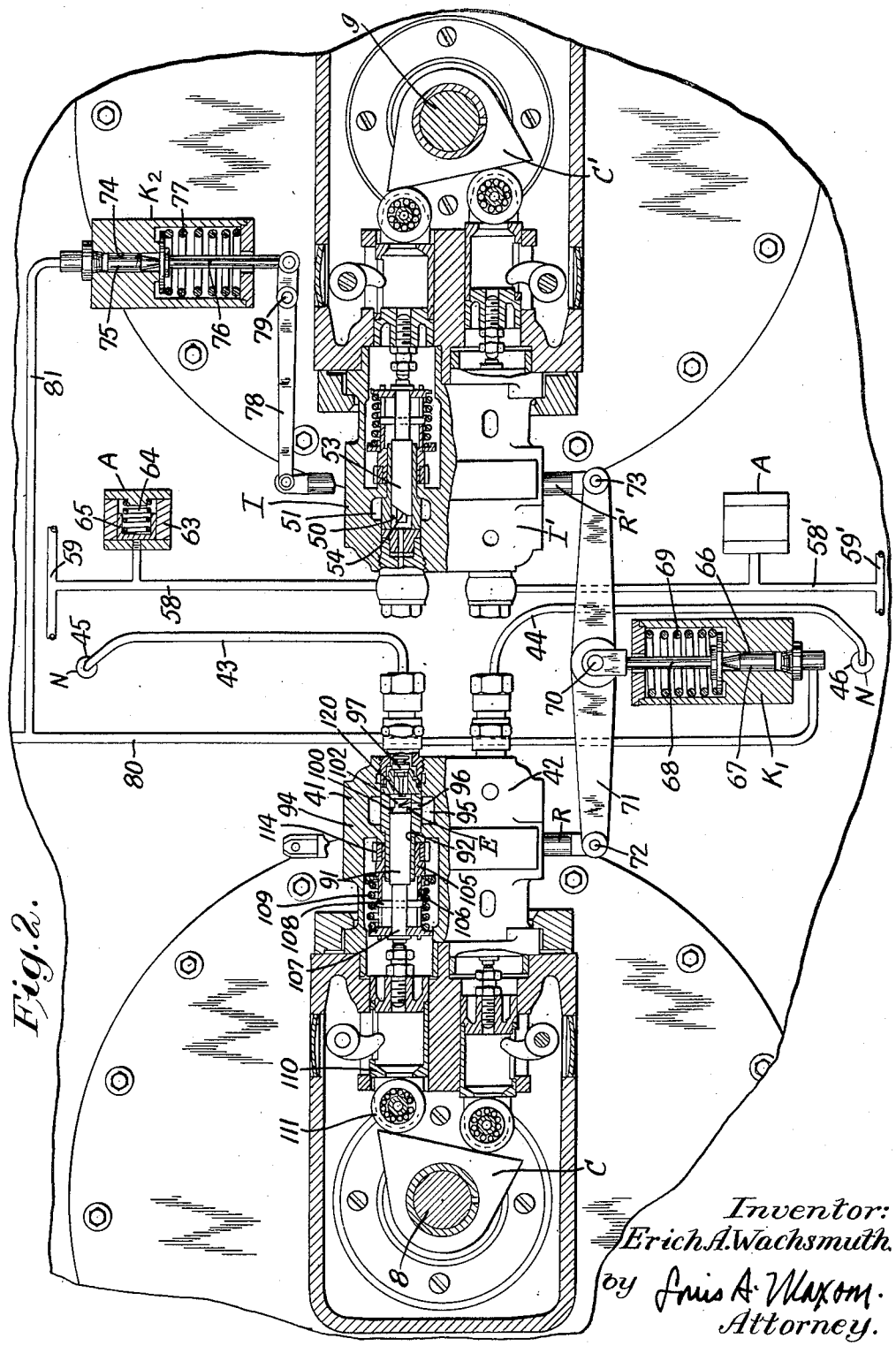
Fig. 2 is a diagrammatic view illustrating one form of automatic controlling apparatus for the twin motor-compressor illustrated in Fig. 1.

Fig. 11 is a diagrammatic view similar to Fig. 2, but illustrating an embodiment of the invention in which mechanical unseating of the fuel pump discharge valve is replaced by a special construction of fuel pump barrel and plunger.

Figs. 12, 13, 14, 15, 16 and 17 illustrate the structure and mode of operation of a modified pump construction in which the fuel pump plunger controls a small vent hole leading back to the suction chamber of the pump, maintaining this hole continuously closed as long as the machine is not exceeding its minimum stroke, but progressively opening (uncovering) it for increasing periods as the stroke is increased to normal and for even longer periods if and when the stroke increases toward maximum, Figs. 12, 13 and 14 being respectively central longitudinal sections showing the fuel pump plunger in a much retracted position, in a position in which the machine is not exceeding its minimum stroke, but is about to do so as its stroke length builds up, in a position corresponding to that which exists when the machine is working a stroke on the order of normal, and in a position when the machine is working a stroke on the order of maximum; Fig. 15 being a perspective of the fuel pump plunger, Fig. 16 a central longitudinal section through the cylinder and casing of the fuel pump on the same plane as Figs. 12, 13 and 14, and Fig. 17 being a central longitudinal section at right angles to the plane of Fig. 16.

Fig. 18 is a longitudinal section through an injection pump of the accumulator type constructed according to the principles of the embodiment of Figs. 11 to 17.

It will of course be understood that the present invention may be practiced with other forms of free-piston compressors than the one which will be now described for the purpose of illustrating a setting of the invention from certain of its aspects, and for illustrating the invention in its more comprehensive, motor-compressor aspect in a preferred embodiment.

Figure 1:
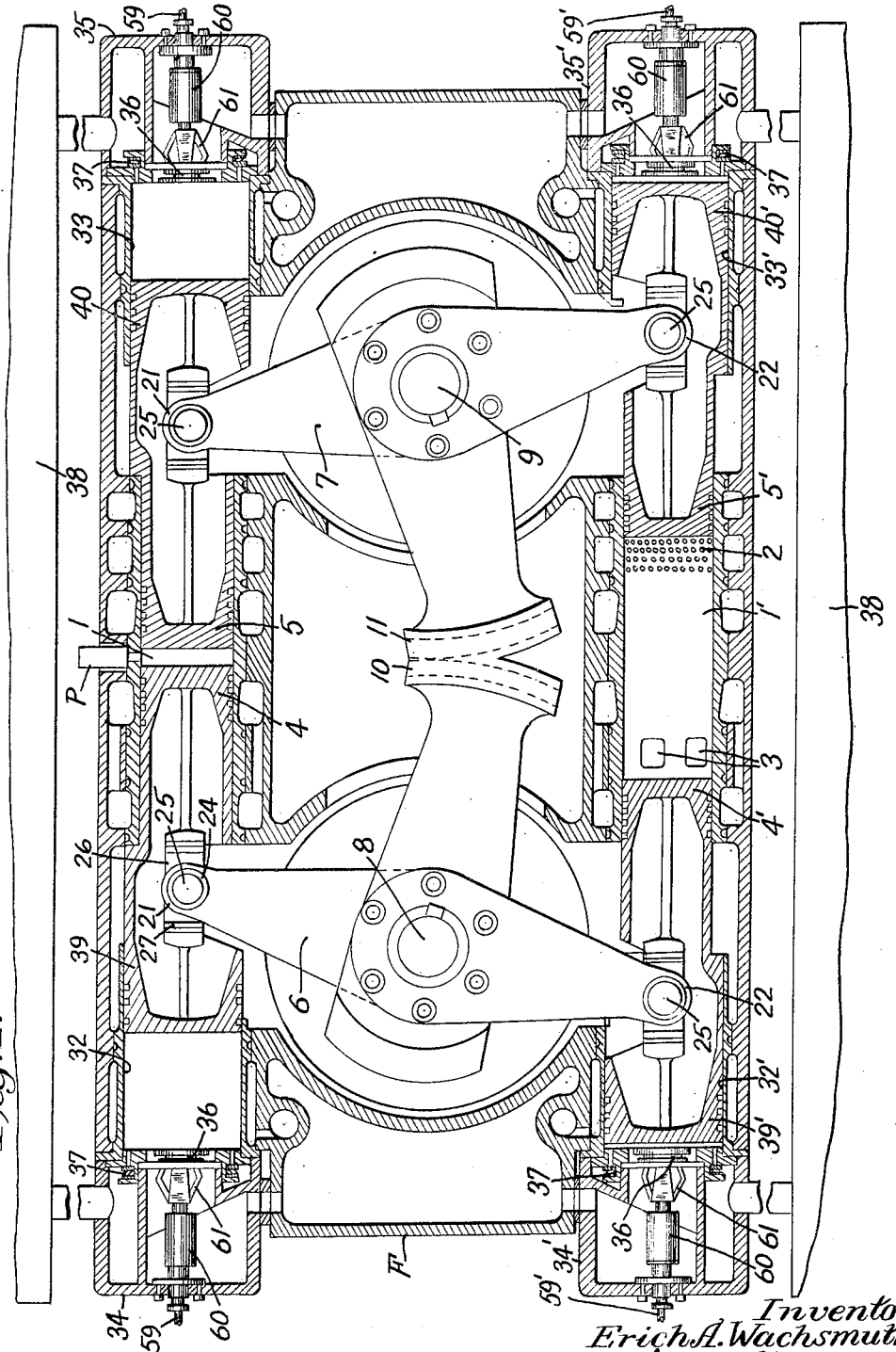

For a more detailed illustration of the motor-compressor mechanism illustrated in Figs. 1 and 2, reference can be had to my copending applications Serial No. 272,019, filed February 18, 1952, now Patent No. 2,775,398; Serial No. 285,472, filed May 1, 1952, now abandoned of which application Ser. No. 634,472 is a continuation now Patent No. 2,841,322 issued July 1, 1958 and Serial No. 297,745, filed July 8, 1952, now Patent No. 2,755,988.

Now referring first to Fig. 1, it will be noted that there is shown a motor-compressor comprising twin motor cylinders 1 and 1' which have their axes at least substantially parallel and which are supported by a frame F. The motor cylinders 1, 1', have reciprocable in them in counterstroke relation to each other pistons 4, 5 and 4', 5' which control scavenging ports 2 and exhaust openings 3. The four pistons, formed as differential pistons, are coupled in pairs (4 with 4' and 5 with 5'), each pair by a double-armed rocker 6, 7 (otherwise stated: centrally pivoted levers), the first pair by the rocker 6 and the second by the rocker 7, so that the outward, working strokes of the pistons associated with the cylinder 1 occur with and indeed compel the inward, compression, strokes of the corresponding pistons on the cylinder 1' and vice versa. The double-armed rockers 6 and 7 are pivoted respectively by shafts 8 and 9 in the frame F, and they have in fixed relation to them gear segments 10 and 11 which swing in the same angular directions as their respective rockers. These segments, through their mutual engagement, prevent the piston systems from getting out of synchronism with each other. The outer ends or arms of the double-armed rockers 6 and 7 are designated 21 and 22. The outer ends of each arm are provided with bearings 24 surrounding pins 25 which are in turn supported in box elements 26, and these box elements are slidably arranged in guides 27 extending transversely to the several pistons and providing for guided movement of the boxes 26 transversely of this postons as the latter reciprocate. Compressor cylinders 32 and 33 and 32' and 33' are disposed coaxially with the motor-cylinders 1, 1' and are open at their ends toward the engine cylinders, but closed at their other ends by cylinder heads 34, 35 and 34', 35'. These cylinder heads carry and house the suction and discharge valves 36 and 37 for the compressor cylinders. Two receivers 38, suitably connected in communication with each other, are shown, and compressor pistons 39, 40 and 39', 40', reciprocable in the cylinders 32, 33 and 32' 33' pump fluid. Twin fuel injection pumps (see Fig. 2) are shown at 41 and 42, and may be driven as from the rocker shaft 8 in any suitable manner, as by a rocking cam C. Conduits 43 and 44 conduct fluid from the fuel pumps 41 and 42 respectively to suitable nozzles, which are illustrated only by the circular bodies designated N and the reference characters 45 and 46, one nozzle associated with the motor-cylinder 1 and the other with the motor-cylinder 1'.

The fuel injection pumps 41 and 42 are of the so-called port control type. Such pumps control their ports by means of a spiral edge on the pump plunger, and the plunger can be turned in the pump barrel while pumping, thus changing the portion of the plunger stroke during which the ports are covered, and the fuel is forced towards the nozzle.

The fuel oil supply system to the pumps, being conventional, needs no illustration.

The cylinders 1 and 1' are, as above noted, provided with connections N for receiving the injection nozzles and, in addition, one of the cylinders, herein the cylinder 1, is provided at its mid-point, longitudinally, with a chamber structure P communicating with the mid-point of the motor cylinder bore, and having suitable firing mechanism (not shown) associable with it.

To start the motor-compressor, the pistons 4, 5, are brought in any suitable manner to their mutually adjacent "dead center" position, and a small cartridge, provided with a correctly measured powder charge, is inserted in the chamber structure P, and, when this powder charge is ignited, the pistons are forced apart in cylinder 1, and compression is effected in cylinder 1', so that injection of fuel into cylinder 1' as the pistons 4', 5' compress the air between them in the cylinder 1' will result in an explosion occurring in cylinder 1' and a forcing apart of the pistons 4' and 5' and a concurrent driving together again of the pistons 4, 5. Each time the pistons uncover the exhaust and scavenging ports which they control exhaust and scavenging will be automatically effected as will be later described; and, upon the compression strokes of the motor pistons, the new charges of air will be compressed (and heated) and upon fuel injection, new working strokes will be caused to take place, and running will be continued under the control of apparatus which will now be described in some detail, much of which is described in application Serial No. 285,472, above referred to. The exhaust and scavenging arrangements, their operation, and why they so operate will be later described and explained.

As previously indicated, the internal combustion engine cylinders 1 and 1', which are illustrated as forming portions of opposed-piston, Diesel engine units, are adapted to have fuel oil pumped to them respectively by the pumps 41 and 42. The construction of these pumps will be later described in appropriate detail and incorporate provision for automatic variation of the instant of fuel delivery and the duration of such delivery, the variation being effected in a generally well-known manner, as by reciprocation of a rack bar R, which rotates the pump plungers on their axes in such a manner as to vary the fuel delivery of the pump between a maximum and zero. By the proper shaping of the usual slanting control edge of the pump plunger later described, practically any rate of fuel displacement can be effected as a function of the angle of rotation of the pump plungers. In view of the full discussion in Serial No. 285,472, above referred to, there need be no extended discussion of this here, and it may simply be said, for purposes of illustration, that the rack bar R is displaced as a function of receiver pressure under the control of a receiver pressure responsive cylinder and piston mechanism $K_1$, and that the control edge of the pump plunger will be so formed and the movements of the rack bar R be coordinated with receiver pressure in such a manner that when receiver pressure is at zero pressure gauge there is supplied the proper quantity of fuel to be burned to effect starting; when receiver pressure is at 14.7 pounds gauge there is supplied the proper quantity of fuel to be burned to effect the compression and discharge against that pressure of the quantity of air taken in; and as receiver pressure increases the quantity of fuel injected is properly increased. Of course, the quantity of fuel injected at each receiver pressure provides for the work of compression of the scavenging air supplied to the motor, as well as for the compression and discharge of air taken into the compressor cylinders.

Another receiver pressure responsive device $K_2$ controls the quantity of air delivered, and this pressure responsive device, which becomes operative as a control as soon as receiver pressure exceeds the normal lower limit of the designed operating range, for example, 7 atmospheres gauge, does so through hydraulic impulse givers I, I' which may be of essentially the same type of construction as the pumps 41, 42. Within the normal operating range, say from 7 atmospheres gauge to 7.7 atmospheres gauge, the device $K_2$—another cylinder and piston mechanism as shown—adjusts the amount of air delivered by the compressor all the way from maximum down to zero delivery, if receiver pressure continues to rise, as might occur if all air use were discontinued. The impulse givers I, I' as illustrated are arranged side by side, one above the other, and are adapted to be caused to give their impulses in alternation by suitable cam actuating means C'. The pumps 41, 42 and the impulse givers I, I' are respectively actuated by cams C and C', each, as shown, a double cam, mounted respectively on the shafts 8 and 9. As in the case of the fuel pump, the control element of each impulse giver is a plunger with a sloping control edge reciprocated in rhythm with the motor-compressor piston with which it is coordinated and moving in a bore in a cylinder which is provided for it. The shape of the control edge is determined empirically, in connection with the mechanical coupling for the control rod of the fuel pump, so that for each load stage of the compressor the work output of the motor and the work absorbed by the compressor are in equilibrium.

During each reciprocation of its pistons the impulse givers I and I' produce hydraulic impulses which are used to control fingers cooperating with the compressor suction (inlet) valves in such a way that the suction valves are held open for a smaller or larger portion of the compression strokes of the compressor pistons 39, 40 and 39', 40'. Each of the impulse givers acts simultaneously on two finger systems, one associated with each of the alined compressor cylinders of a pair. In application Serial No. 285,472, above referred to two different possible means for effecting different degrees of unloading are illustrated. In this present application but one will be described for purposes of illustration, and it will correspond generally to the second means disclosed in the earlier filed case mentioned.

Figure 6:
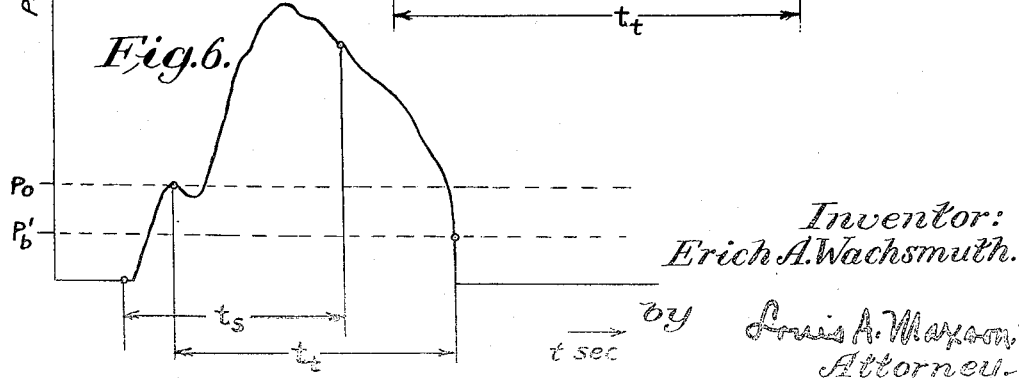
Fig. 6 is a diagram which illustrates the pressure variations in the same system when relief is effected, in accordance with the invention, when strokes of a length above normal occur.

The impulse givers I and I' each comprise, as shown in Fig. 2, a cylinder 50 connected with a supply space 51 by a port not shown in Fig. 2 but shown in Fig. 6 of application Serial No. 285,472, above referred to, to which supply space a hydraulic fluid is conducted from any suitable reservoir (not shown), said cylinder 50 containing a plunger 53 having a control edge 54 generally helically extending about its periphery at its working end. The impulse giver plungers are actuated in turn by the cam C' and are adapted to be rotated by a rack bar R' under the control of the pressure responsive device $K_2$ to change the timing of the fluid impulses. The cylinder 50 of the impulse giver I is connected by conduits with cylinder and piston mechanisms which keep open the inlet valve associated with the cylinders 32 and 33, and the impulse giver I' is similarly connected by conduits with cylinder and piston mechanisms which keep open the inlet valves of the cylinders 32' and 33'. These conduits are numbered 58 and 59 in the case of impulse giver I and 58' and 59' in the case of impulse giver I'. These last cylinder and piston mechanisms, numbered 60, actuate finger mechanisms 61 which are arranged to hold inlet valves open and to have their movements suitably limited as described in application Serial No. 285,472, above referred to. To provide for necessary maintenance of the inlet valves open during a portion of the discharge strokes of the compressor pistons, an accumulator A is associated with each conduit 58, 58', and comprises a chamber forming member 63 in which a spring 64 acts to press a septum-forming member 65 in a direction to minimize the volume of fluid in the chambers which communicate with the conduits 58, 58'. The accumulators A, may use diaphragms, bellows, or any other desired equivalents of pistons to minimize or prevent fluid leakage.

The outward (pumping) movements of the pistons or plungers 53, are, in the arrangement shown, coordinated with the suction strokes of the compressor pistons. In other words, the movements of the plungers in their cylinders occur during the suction strokes of the compressor pistons. The oblique control edges 54 determine the beginning of fluid delivery. The outwardly moving plungers at first force fluid from their cylinders back into the supply space and then, when the control port is covered—earlier or later depending on the amount of plunger rotation—by the slanting control edge on the plunger, fluid delivery to the conduits 58 or 58' commences and the finger operating cylinder and piston mechanisms are actuated to hold the inlet valves in open position. After the finger operating cylinder and piston mechanisms reach the limits of their operating movement, the fluid delivered by further plunger movement is stored in the accumulators. Delivery and storage in the accumulators of fluid continues until the cam reaches its limit of swing, and upon reverse movement of the cam the system still remains under the pressure resulting from the provision of the accumulators until the latter are empty. Only then do the inlet valves close. The inlet valves close at the moment the slanting control edge uncovers the control port. The plungers continue inward movement in their cylinders, and the space being enlarged by inward movement of the plunger is filled from the supply space until the dead position is reached.

Further details with respect to this mechansim may be had by reference to application Serial No. 285,472 hereinabove mentioned.

As previously noted, the adjustment of the fuel supply to the work of compression and discharge of the air (which is dependent on the receiver pressure), and of the quantity of air to be handled, are obtained by giving a suitable form to the fuel-pump control-edges and to the control-edges of the impulse givers controlling the quantity of air delivered, and rotating the plungers of these devices on their axes.

Pressure responsive device $K_1$, as above pointed out, is a device acting between 0 p.s.i.g. and the lower limit of the designed pressure range, and it consists of a cylinder 66, a piston 67 having a piston rod 68, and a spring 69. 70 represents the point of pivotal connection of the piston rod 68 with a two-armed lever 71, which is connected, on the one hand, at 72, with the regulating rack R of the fuel pumps 41 and 42, and, on the other hand, at the articulation point 73, with the regulating rack bar R' of the impulse givers I and I' which control the quantity of air pumped by the compressor. The pressure responsive device $K_2$ acting over the pressure range between the lower and the upper designed operating pressures consists of a cylinder 74, a piston 75 having a piston rod 76, and a spring 77 suitably tensioned to cause it to commence to yield only when the lower rated pressure (as above explained, for illustration, 7 atmospheres) is exceeded. (It may be made responsive to the excess of receiver pressure over a predetermined pressure, by the use of a suitable relief valve permitting only the excess to pass it.) Due to the high spring tension and the relatively small effective pressure, the active range of this device is but small. It transmits, via a lever 78, pivoted at 79 and acting on the control element R' at the other end of the latter, adjustments to the regulating-rod R' necessary for the regulation to be accomplished between zero- and full-load. 80 and 81 are pressure lines connecting the devices $K_1$ and $K_2$ respectively with the receiver.

It will be understood that with twin pumps and twin hydraulic impulse givers the elements R and R' might be duplicated, each pump and each impulse giver having a control rack individual to it and those of each pair being then concurrently actuated. This duplication, however, is unnecessary.

The symmetrical arrangement of the fuel pumps and impulse givers makes it requisite that the cams which actuate them be arranged with their angled control surfaces facing towards each other.

The positions of the parts in Figs. 1 and 2 correspond to the conditions present before starting of the compressor. With rising receiver pressure, the piston 67 moves, against the pressure of the spring 69, upwardly in Fig. 2, while the piston 75, owing to the considerably higher initial tension of the spring 77, remains at first at rest. The piston 67, moving upwardly, displaces, through the lever 71, swinging about the then stationary point 73, the regulating rod R, in accordance with the increasing work of compression, toward full load position, which is reached at the upper position of the piston 67, corresponding to the lower limit of the designed normal pressure range. If the receiver pressure continues to rise further, the piston 75 commences to move downwardly, and to displace, through the rack bar R', which thereupon moves upward, that is, in the direction of zero air delivery, and through the lever 71, which is now swinging about the now stationary point 70, the regulating rod R of the fuel pump downward, that is, toward no-load running position.

Figure 3:
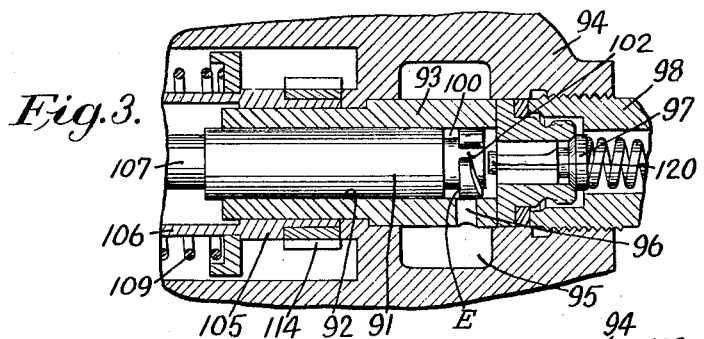
Fig. 3 shows on an enlarged scale the pump cylinder of a fuel injection pump, showing the pump plunger, the pump discharge valve, and one thrust pin arrangement for causing relief of fluid from the injection system in accordance with one embodiment of the present invention.
Figure 4:
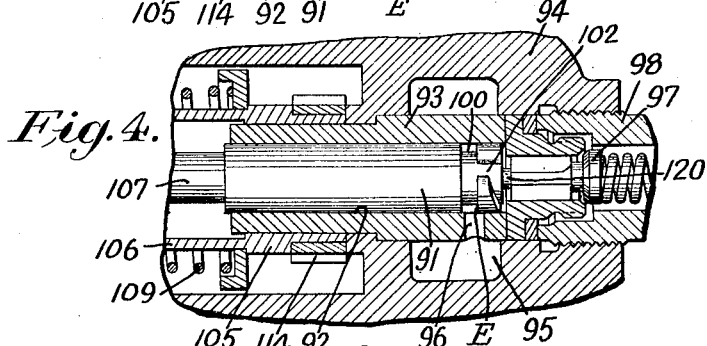
Fig. 4 is a corresponding view showing the pump parts in a different relation to each other.

Referring now to Figs. 2, 3 and 4 it will be noted that the pump 41 (and a like description applies to the pump 42) comprises a plunger 91 reciprocable in a bore 92, in a pump cylinder member 93 which is mounted in a body 94, in which there is a circumferentially extending chamber 95 in which liquid fuel is maintained under an appropriate pressure. The chamber 95 is communicable through an inlet port 96 with the bore 92. A discharge valve 97 is arranged in a head structure 98 of the pump, and when unseated places the cylinder bore 92 in communication with a delivery conduit, for example, the conduit 43 leading to the nozzle 45. The plunger 91 has a groove 100 surrounding it near its working end which communicates through a longitudinal peripheral slot 102 with the end of the pump plunger. The end of the pump plunger is progressively cut away circumferentially, with the result that there is a cutting away helically of the peripheral portion of the pump plunger which lies toward the working end of the latter from the groove 100. The quantity of fluid displaced by the pump plunger is variable by rotating the plunger on its axis. Until the inlet port 96 is closed, no pumping of fluid past the discharge valve 97 takes place, instead, the fluid flows freely through the slot 102 and groove 100 back to the inlet port and the chamber 95. If the pump plunger is rotated to a proper relative position with respect to the inlet port 96, fluid will be displaced from the time when the inlet port is closed on the outward movement of the plunger 91 until the groove 100 comes into communication with the port 96. Since the groove 100 is of uniform width, interruption of discharge of fluid by the pump past the discharge valve 97 always takes place at the same point in the pumping stroke of the plunger 91, but the amount of fluid displaced may be varied by rotation of the pump plunger on its axis, from zero to a predetermined maximum. A rotatable sleeve 105 surrounds the pump cylinder 93, and has a portion 106 which surrounds a reduced portion 107 of the pump plunger 91. The sleeve portion 106 is longitudinally slotted parallel to its axis at each of its opposite sides, and a crossarm 108, fixed to the reduced portion 107 of the plunger 91, is reciprocable in the slots. A suitable spring 109 normally maintains the pump plunger in retracted position, i.e. pushes it in the direction in which it travels during its suction stroke. A reciprocable body 110, carrying a freely rotatable cam contacting element 111, is adapted to be moved by the cam C in a direction to effect its movement, and a resulting movement of the pump plunger 91, in a direction to effect a pumping stroke. The sleeve 105 is surrounded by and has secured to it a pinion 114 with which the fuel rack bar R engages, and the amount of fluid displaced by the pump on each working stroke is determined by the position of the rack bar R. One control of the positioning of the rack bar has been hereinabove described, but it will be understood that the rack bar may have its position varied in accordance with the load, or in accordance with the speed of the compressor through well-known connections with a speed responsive device.

It will be appreciated that the oscillation of the cam C varies directly with the oscillation of the arm structure 6, and the oscillation of the latter is determined by the length of the strokes of the pistons 4 and 4'. If there is any overstroking (stroking between "normal" and "maximum") of the pistons 4 and 4', the cam will be oscillated through such an arc that the pump plunger 91 will also overstroke. It may also be noted, for its relevance to the embodiment of Figs. 7, 8 and 9, that if strokes of less than "normal" length occur, the pump plunger strokes are correspondingly shorter. The pump will not, of course, pump any additional fuel during its overstroking, because the pumping space within the cylinder 93 will have been placed in communication with the inlet port 96 before the normal pumping stroke of the pump plunger is reached.

The enlarged illustration provided in Fig. 3 of the pump proper shows the pump plunger 91 in its "normal" top position. The pumping action was actually interrupted shortly before the attainment of the position shown, when the controlling edge E on the moving pump plunger 91 exposed the inlet port 96 and thereby connected the working space of the pump through slot 102 and circumferential groove 100 with the suction space 95 of the pump.

The present embodiment takes advantage of the overstroking of the fuel pump plunger which attends overstroking of the engine-compressor pistons to correct the unstabilization as it occurs. If any overstroking of the fuel pump plunger be caused to reopen the pump discharge valve after the end of fuel displacement by the pump plunger but before the end of the pumping stroke, there may be a release of fluid from the conduit system leading to the nozzles with a resulting reduction in the quantity of fuel delivered to the engine cylinder and a reduction in the energy provided upon the immediately succeeding working stroke of the engine pistons. To effect such a reopening of the discharge valve of the pump there is provided means between the pump plunger and the discharge valve for causing overtravel (travel over "normal") of the pump plunger to force the discharge valve again off its seat, and while such means may assume different forms and may, for example, be formed on or carried by either of the pump plunger or the cylinder end of the discharge valve, it is shown in Figs. 3 and 4 as a projecting pin portion 120 on the upstream end of the discharge valve, of such length that any material overstroking of the fuel pump plunger will raise the discharge valve from its seat, and vent back past it to the pumping space, through the grooves on the pump plunger and the port, some of the fuel which has not yet been discharged through the fuel injection nozzle.

Figure 5:
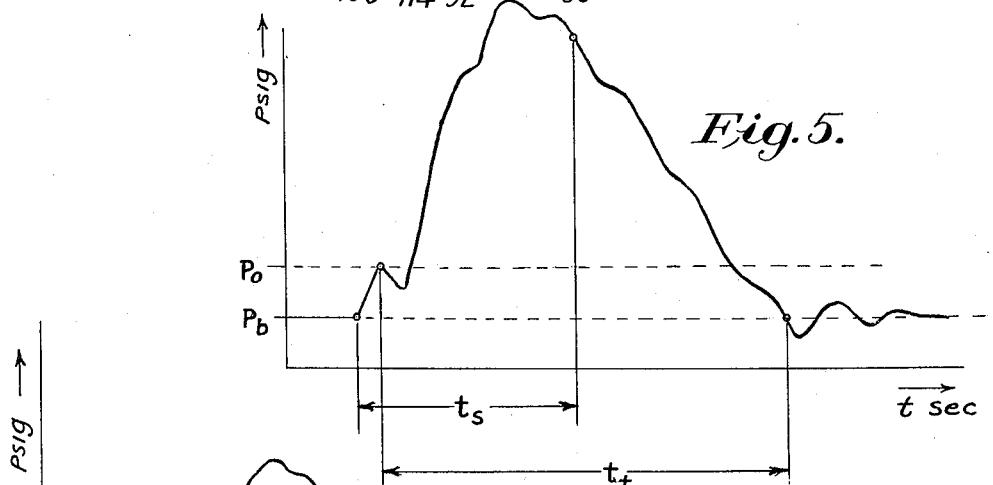
Fig. 5 is a diagram illustrating the pressure variations under normal stroke conditions in the fuel injection system in which the fuel pump of Figs. 3 and 4 is incorporated according to the first regulation possibility above mentioned.

Fig. 5 shows an injection pressure diagram corresponding to a particular load condition and wherein neither the current nor the preceding motor compression stroke overran its "normal" length. The initial pressure $p_b$—since for this diagram no prior relief is assumed to have taken place—approaches closely to the pressure which exists at the closing of the injection valve. $p_o$ is the injection valve opening pressure. $t_s$ is the actual time during which the pump displaces fluid and $t_t$ the total injection time. The after-injection, that is the injection period after the conclusion of the fluid pumping period, is a phenomenon which, if properly controlled, is generally advantageous with free-piston machines. It has its cause in the compressibility of the fuel, and may be augmented by the provision of an accumulator if desired. It is further influenceable by alternation in the design characteristics of the injection system.

In connection with the foregoing illustration of the first embodiment of the invention herein described in detail, the after-injection presents the further advantage and possibility that a relief initiated before cessation of injection through overstroking may have a work reducing effect on the very motor stroke which is taking place, whereby a substantially uniform operation of the machine is accomplished. Simultaneously, however, the relief in accordance with the extent of the overstroke reduces the initial pressure $p_b$ in the injection system and effects thereby, with a constant pumping stroke of the pump, a reduction in the volume of fuel injected. Also on the next working cycle the quantity of fuel driven out of the injection system past the lifted discharge valve in accordance with the reduction in pressure must be made up out of the quantity of fluid displaced by the pump and is not available as injection quantity.

The diagram of Fig. 6 shows an injection curve illustrative of one possible condition of relief. The pressure at the end of injection falls more steeply than with an unrelieved pump and the mean pressure $p_b'$ of the fluid column is no longer determined by the closing pressure and the characteristic of the injection nozzle, but through the extent of the relief.

In the embodiment of the invention which has just been described, the pump plunger 91 does not contact the projecting pin portion 120 on the discharge valve 97 until just after the plunger reaches a position corresponding to "normal" stroke. As a result, this embodiment exercises its function of opening a passage for the return of fuel from the line 43 to the nozzle only during overstroking. If the thrust pin or projecting pin portion be provided of such length that it is engaged by the pump plunger as soon as the plunger stroke grows beyond its "minimum" length, a valuable further control is obtained, and Figs. 7, 8 and 9 may be noted in connection with another embodiment of the invention in which this modified arrangement is present.

In this embodiment the device works in both directions so-to-speak, that is, it diminishes the injected amount of fuel upon overstroke, but it also increases it beyond the "normal" amount in case of understroke.

The amount of fuel injected will be, at "minimum" stroke, approximately 110% of the fuel consumption at "normal" stroke, and at "maximum" stroke the amount of fuel injected will be about 90% of the amount at "normal" stroke.

As in Figs. 7, 8 and 9, the pump construction in general is the same as is disclosed in Figs. 2, 3 and 4, and the major difference resides in the lengthening of the projecting pin portion 120′, the same reference characters can be used on Figs. 7, 8 and 9, with the exception noted, as in Figs. 3 and 4. With this arrangement, the amount of injected fuel is increased in the case of understroke (stroke between "minimum" and "normal"), as well as diminished in case of overstroke. It will be understood that, for the same engine-compressor, loads, and strokes, with the discharge valve materially open in the "normal" stroke position of Fig. 8, something needs to be done to insure the proper amount of fuel injection at the "normal" stroke, that is, if there be a greater opportunity for the return of fuel from the line to the nozzle provided in the "normal" stroke position of the plunger, the displacement of a somewhat greater volume by the pump plunger at "normal" stroke may be necessary. If it is not desired to change the pump dimensions (though this would of course be possible) a rotary adjustment of the pump plunger to effect a slightly earlier initiation of the pumping of fuel may be desirable.

This might make a slight difference in actual practice in the appearance of the right-hand end of the pump plunger in Figs. 7, 8 and 9 from the appearance in Figs. 3 and 4, but it is believed unnecessary to show this in Figs. 7, 8 and 9.

In any event, in Fig. 7, illustrating the "minimum" stroke position of the pump plunger, it will be appreciated that as soon as this "minimum" stroke is exceeded there will commence an initially very small but, as the pump stroke increases, gradually increasing, opening for the return of fluid. As with the pump plunger in "normal" position as shown in Fig. 8, it will be appreciated that a larger amount of fluid will be returning from the nozzle line than is taking place in Fig. 7, it will be evident, bearing in mind that even in Fig. 7 the positive displacement of fluid by the pump plunger has ceased, that a greater net quantity of fuel will be passing through the nozzle line to the nozzle in Fig. 7 than in Fig. 8, and so that if the stroke is below "normal" additional fuel is injected to bring the stroke up to "normal." As the relationships which exist between the "maximum" stroke of Fig. 9 and the "normal" stroke of Fig. 8 will be readily understood from the description of Figs. 3 and 4, it is unnecessary to go into detailed discussion of conditions between "normal" stroke and "maximum" stroke, for it will be evident that as the pump plunger increases its travel from "normal" to "maximum" travel, there will be an offsetting return of increased quantities of fuel which will cause overstroking to be overcome.

It will be understood that the invention may also be practiced with an accumulator-type pump, so far as having a discharge valve moved mechanically off its seat by a pump plunger is concerned, and Fig. 10 is included to show how this could be accomplished. The general arrangements in Fig. 10, so far as the pump plunger 91 and the pump barrel 93 are concerned, are essentially the same as in preceding embodiments. The casing 94' is somewhat different in proportions in order to accommodate in a bore 125 a different arrangement of parts. It will be noted that a block 126 fitting the bore peripherally engages the head end of the pump barrel 93. This block is traversed by a through port 127, and houses, in a bore 128, a valve element 129 which is adapted to engage a seat 130, through which a passage 131 opens into communication with the head end of the pump barrel. The valve 129 has a projecting stem portion 133 engageable by the pump plunger in a manner corresponding to that in which the stem or pin portion 120' of Figs. 7, 8 and 9 is engaged. The valve is hollow, and is normally seated by a spring 134 received within it. The wall of the valve is traversed by ports 135, which connect the hollow interior of the valve with an annular groove 136 in the block. When the valve is unseated the interior of the valve and the space to the right of the valve in Fig. 10 are placed in communication with the right-hand end of the bore 92 of the pump barrel through the port 131, the space around the seating portion of the valve 129, the groove 136, the ports 135 and the interior of the valve, and the bore 92 then is connected with a conduit 138 formed in a connecting element 139 which is provided at its opposite end with a threaded connection 140 by which it is adapted to be attached to a nozzle line. The passage 138 is connected at its end remote from the valve 129 with a cross passage 142. one end of which communicates with a plunger 143 mounted in a bore 144 and normally pressed against a shoulder 145 surrounding the adjacent end of the cross passage 142 by a preloaded spring 146, which exerts an appropriate heavy pressure, as for example, but without limitation thereto, a pressure on the order of 2800 pounds per square inch.

It has previously been mentioned that the block 126 is traversed by a through passage 127. This communicates at its end remote from the bore 92 with a passage 150 formed in a tube 151 received in a bore 152 in the member 139. The tube 151 is not slidable in the bore 152 and does not fill the full length of the bore, with the result that a chamber 153 constituted by the right-hand end of the bore 152 is provided, and in this chamber 153 there is reciprocable a valve element 154 having a reduced end 155 of such length that whenever the valve is spaced from a seat 156 there is communication between the end of the cross passage 142 opposite the plunger 143 and a passage 157 which is connected with the fuel injection nozzle. It will be evident that when the valve 154 is in its right-hand position it seals off communication between the cross passage 142 and the passage 157, and the annular area 158 which surrounds the reduced portion of the valve provides a shoulder which is constantly subjected to the pressure which exists in the cross passage.

By reason of the construction so far described it will be appreciated that, during the displacement of fluid by the pump plunger 91, the valve 154 is forced to a position in which communication between the passage 157 and the cross passage 142 is interrupted, and accordingly the fuel which is displaced past the discharge valve 129 passes through the passage 138 and the cross passage 142 and displaces the plunger 143 against the force of the spring 146 and is stored under pressure in a chamber formed at the upper end (as viewed in Fig. 10) of bore 144 by the downward displacement of plunger 143 ready for delivery to the fuel injection nozzle as soon as the pressure in the chamber 92 drops, as occurs when the port 96 is uncovered, and then the spring 146 forces the plunger 143 to discharge the fuel from the chamber formed in the upper end of bore 144 through the cross passage 142 and the chamber 153 into the passage 157 and the connection from the threaded end 140 to a fuel injection nozzle. Evidently the valve 154 will be maintained in its left-hand position so long as fuel is being displaced from the chamber formed at the upper end of bore 144 and this will be so even though a portion of the fuel previously displaced past the valve 129 will be permitted to be returned around that valve when the same is unseated through the engagement of the stem 133 by the end of the plunger 91. It will be evident that the relation of the projecting stem portion 133 to the plunger 91 may be made either as in Figs. 2, 3 and 4 or in Figs. 7, 8 and 9, and accordingly it is not necessary to describe again the manner of control which has heretofore been explained with constructions in which a valve directly controls the delivery of fuel to the nozzle, for so far as the venting back of fuel is concerned the arrangement of Fig. 10 may operate in the same manner.

Before turning to a rather substantially different embodiment of the general invention a few further remarks with respect to Figs. 7, 8 and 9 may be worth-while. It will be understood that in the case of each of Figs. 7, 8 and 9 the actual amount of fuel displaced by the pump plunger will be the same. This naturally follows from the fact that the effective delivery stroke is the same in each case. In Fig. 7 the plunger speed during delivery is lower than in the case of Fig. 8 and still less than in the case of Fig. 9. Therefore, the peak pressure associated with the relative position of the parts shown in Fig. 9 will be the highest and in the case of Fig. 7 the lowest, assuming that in all three cases the strokes start with the same pressure in the injection pipe. In spite of the different peak pressures the injected amount of fuel, were the check valve not to be reopened during the so-called after injection, would be the same in each case.

This would be the case when delivery starts so early that at the moment the plunger hits the valve the entire injection including the after injection is passed. In this event the reopened valve relieves only to a more or less extent the pressure which remained in the system when the injector closed. The injected amount of fuel at the succeeding stroke will automatically decrease because the amount of fuel that escaped out of the system has to be replaced first by the succeeding delivery. Actually the injection starts only early enough to end the delivery—even in case of the smallest operating stroke—while the plunger is still traveling with a speed sufficient to provide a good atomizing effect. Therefore, at least for full load, with its longer after injection, there is a good chance that in the case of normal or overstroke the check valve might become reopened before the after injection is ended. In that event the tail of the injection would be cut off affecting to a certain degree the combustion of the fluid delivered on that very plunger stroke. It may be further noted, though it is not to be understood that these figures are limiting, that ordinarily the maximum over-travel or under-travel of the pump plunger will be only on the order of .004 inch.

Instead of opening the delivery valve in the event of overstroke by a push of the plunger, the fuel pump plunger, according to the embodiment of the invention now to be described, controls a small hole connected with the system behind the delivery valve, which hole is closed by the plunger as long as the machine is not exceeding its minimum stroke. When this minimum stroke is exceeded, the plunger opens the control hole more or less. During this period of time a very closely controlled amount of fuel escapes through the hole to the suction chamber of the pump, whereby it is driven out by the combustion pressure in the case of an open nozzle, or by the remaining pressure in the system in the case of a closed nozzle. This lost (escaped) amount of fuel must be replaced by the next delivery stroke of the pump plunger before injection can start, and this means that the next injected amount of fuel is smaller by the lost portion.

To obtain the desired stabilizing effect it is necessary, due to the hunting characteristics of a control, to fix the position of the control hole in such a way that for the "minimum" stroke with which the machine can operate, there shall be no discharge of fuel through the hole. For "normal" stroke the amount of fuel delivered by the pump may be diminished, due partially to opening of the control hole, on the order of 9%, while the reduction of fuel for "maximum" stroke may be as much as 18%. It will be understood that these values are illustrative. By this arrangement the amount of fuel delivered by the pump is so balanced that in spite of the fuel discharge the compressor and engine are in equilibrium when the machine is operating with its "normal" stroke. Using the above mentioned rates as a basis for the following figures, there would be injected when the machine is running with its "minimum" stroke 110% of the amount injected at "normal" stroke and at "maximum" stroke the amount of fuel injected would be around 90% of the amount injected at "normal" stroke.

Now referring to Figs. 11, 12, 13, 14, 15, 16 and 17, an illustrative embodiment of the invention in accordance with what has just been said may be observed. Fig. 11 corresponds closely to Fig. 2 and differs therefrom only in the disclosure of the fuel pumps. In this drawing the fuel pump 41' is shown in section and the fuel pump 42' in elevation. Because of the general similarity of Fig. 11 to Fig. 2 and the fact that the details of the fuel pump are disclosed on a larger scale in Figs. 12 to 17 inclusive, no more needs be said about Fig. 11.

Figs. 12, 13 and 14 respectively show the positions of the modified fuel pump of the present embodiment of the invention respectively at "minimum" stroke, "normal" stroke and "maximum" stroke. It will be noted that the injection pump 161 has a pump plunger 162 reciprocable in a barrel 163. A delivery or discharge valve 164 is provided, and from the latter a conduit 165 leads to an injection pipe which may terminate either at an open nozzle or at a closed nozzle as may be desired. The amount of fuel displaced by the pump plunger is controlled by the helix 167 on the pump plunger (see Fig. 15), the controlling edge 169 and the openings 170 and 171 with their respective controlling edges 172 and 173. The plunger 162 has, in appropriately spaced relation to the helix 167, a circumferential groove 174 which communicates through a diametric passage 175 with a longitudinal axial passage 176 which opens through the head end of the plunger. A fuel supply chamber 178 surrounds the pump barrel 163 close to the head end of the latter, and with this supply chamber the outer ends of the openings 170 and 171 communicate. When the plunger 162 is in fully retracted position (not shown in any of Figs. 11–17), the space between its end on which the helix 167 is formed and the end of the cylinder communicates freely through the opening 170 with the fuel supply chamber 178. As the plunger moves toward the end of the cylinder fuel is simply displaced from ahead of it through the opening 170. When, however, the helix overruns the control edge 172 a positive displacement of fluid through the discharge valve 164 commences to take place and continues until the control edge 169 passes beyond the control edge 173, at which time communication between the space beyond the end of the piston and the opening 171 is established, through the axial passage 176, the diametric passage 175, the groove 174 and the opening 171, with the chamber 178. It will be evident that rotation of the plunger on its axis will vary the commencement of positive displacement of fluid by the plunger through the discharge valve, but that this displacement ends at the same point in the outward stroke of the plunger regardless of the rotation of the latter about its axis.

Mention is made above of a small control hole, and this is shown at 184. It communicates through a passage 185 with another passage 186, which opens into an internal groove 187 in a valve casing 188, between which groove and the nozzle there is constant communication through passage means 189 and a central chamber 190 in the discharge valve 164. An annular groove 191 formed in the inner face of the valve casing 188 is in constant communication with the groove 187 through the passage 186, and another longitudinal passage 193 connects this groove with a small radially extending opening or hole 194 into the bore of the pump barrel. The hole 194 is located generally opposite the hole 184 and is of the same diameter, and, as it is connected with the injection line bypassing the delivery valve, the pressure in the injection line admitted through this hole counterbalances the side thrust acting on the plunger produced by the injection pressure acting through the control hole. The hole 194 is so located that it is never uncovered by the plunger, while the hole 184 is, as will shortly be explained, adapted to be uncovered at times by the plunger and brought into communication with the groove 174.

The small control hole 184 is so located as to be closed by the plunger as long as the machine does not exceed "minimum" stroke and is open only when "minimum" stroke is exceeded. It is open to a certain degree at the end of "normal" stroke, and fully open at the end of "maximum" stroke. When the control edge 169 of the plunger opens the hole 184, fuel from the injection pipe can escape through this hole to the suction chamber 178 through the groove 174 and the passage or opening 171 which is then in communication with the groove 174. The fuel is driven by the combustion pressure to which the fuel column in the passage 165 leading to the open nozzle, when one is used, is subjected, or, when the system is equipped with a closed nozzle, the escaping fuel is not driven out by the combustion pressure, but by the pressure which remains in the nozzle line when the injection nozzle is closed.

To provide a better control of the escaping amount of fuel it may be desirable to provide a throttle such as the small groove or relief 192 following the control edge 169 on the pump plunger 162.

An extended description of the mode of operation of this embodiment of the invention is unnecessary, as it has been made clear that the amount of fuel actually displaced by the pump plunger is varied by rotation of the pump plunger on its axis, that the commencement of positive displacement through the discharge valve commences with the closing off of communication between the pump barrel bore and the opening 170, which is an appropriately controlled variable, that the end of positive displacement of fuel by the pump plunger occurs at the same position of the pump plunger in the pump barrel bore regardless of the length of the stroke of the pump plunger in a pumping direction, that there is no return of fuel from the pipe leading to the nozzle through the control hole 184 when the pump plunger is operating with "minimum" stroke, that when the pump plunger is operating at "normal" stroke there is a certain amount of escape back to the fuel supply chamber of fuel through the control hole 184, and that when the pump plunger is operating with "maximum" stroke there is an additional return from the line leading to the nozzle through the control hole. Side pressure on the plunger due to the action of fluid through the control hole, when the control hole is closed, is offset by the provision of the hole 194.

The system of bleeding back variable quantities of fuel through a plunger-controlled control hole, as just described, is also applicable to injection pumps of the accumulator type. Such an arrangement is shown in Fig. 18 in which the pump plunger 162, the fuel supply chamber 178 and openings 170 and 171 may be the same as in the modification just described. The other connections with the bore of the pump barrel are modified as will be noted from the description which follows. The end of the pump barrel is connected with a passage 200 which is closed, except during displacement of fluid by the pump plunger, by a modified discharge or check valve 164', which has an elongated stem portion 201 terminating in a flat end portion 201S adapted to cooperate with a flat seat 202 surrounding the end of the passage 200 remote from the cylinder of the pump. There is an annular space 203 surrounding the elongated stem portion 201 of the discharge or check valve, and this space communicates through a passage 204 with a chamber 205 in which a differential valve 206 is reciprocably mounted. The large end of the differential valve is connected by a passage 207 with passage 200. The small end controls a passage 208 which leads to a conduit 209 leading to a fuel injection nozzle. The control port 184' is connected by a passage 210 with the passage 208 and is adapted, when its end is uncovered, to vent back fuel from the conduit 209 leading to the nozzle. The annular space 203 is also connected by a conduit 212 with a cavity 213 in which a plunger 214 is reciprocable. There is a space 215 beyond the cavity 213 into which the head of the plunger is movable, and in this space, which communicates through a port or opening 216 with an accumulator chamber 217, there is maintained by any suitable means such as a rail pump connected with a passage 218 opening into the accumulator chamber 217 a static hydraulic pressure equal to the injection pressure. The accumulator pressure determines the actual injection pressure during the injection period. When the pump plunger 162 commences the positive displacement of fuel through the passage 200 the pressure is transmitted through the passage 207 to the large end of the differential valve 206 and forces the latter to a position in which fluid cannot pass from the space 203 to the passage 208. Continued movement of the plunger 162 displaces fuel past the valve 164' and into the space 203. As the fuel cannot pass to the passage 208 it passes to the passage 212 and into cavity 213 and forces the plunger 214 back against the hydraulic pressure in the accumulator chamber 217 so that the cavity is enlarged and receives the fuel displaced by the pump plunger 162. When the positive displacement of fuel by the pump plunger 162 ceases, due to the initiation of uncovering of the opening 171 as previously described, the pressure in the passage 200 is immediately dropped, permitting the valve 164' to seat and also removing the hydraulic pressure holding the differential valve 206 in the position shown in Fig. 18. Upon the removal of the hydraulic pressure on the large diameter of the differential valve 206 the latter immediately connects passage 204 and passage 208 and the hydraulic pressure in the accumulator chamber 217 forces the displacement plunger 214 inward, displacing fuel through the passage 209 leading to the nozzle. Injection continues until the displacement plunger reaches the position shown in Fig. 18, in which position it may be noted that a valve-like head 220 on the plunger engages a seat 221 which surrounds the top of the cavity 213. It will be appreciated that the coaction of the pump plunger 162 with the control port 184' will control the bleeding back of fuel from the fuel line 209 through the passage 210 in a manner like that described with respect to Figs. 11 to 17, and therefore a detailed repetition of this control is unnecessary.

From the foregoing description it will be apparent that the invention may be embodied in numerous forms, of which a number have been described, and that the bleeding back from the line leading to the nozzle of a variable amount of fuel during portions of the stroke of a fuel pump plunger is present in all of the different embodiments described. It will be evident that an advantageous control is presented enabling the stabilizing of an engine-compressor in a highly advantageous manner, in all of the embodiments described diminishing the combustion of fuel as the pump plunger increases its stroke from "normal" to "maximum," and in a plurality of embodiments also effecting an increased combustion of fuel as the stroke of the pump plunger is reduced from "normal" to "minimum." It will be evident that a very desirable control is accomplished, because of its immediacy, and the control is such that only a very small variation in length between "maximum" and "minimum" stroke takes place, thus preventing damage to the engine-compressor. As other advantages are clearly pointed out in the course of the foregoing specification no more need be said here by way of summary.

While there are in this application specifically described several embodiments which the invention may assume in practice, it will be understood that these forms of the same are shown for purposes of illustration and that the invention may be modified and embodied in various other forms without departing from its spirit or the scope of the appended claims.

What is claimed is:

1. An internal combustion engine having a combustion chamber and a piston movable in said combustion chamber with variable travel, conduit means through which fuel is conducted en route to said combustion chamber, a fuel pump connected to discharge fuel to said conduit means, said fuel pump having a cylinder and a plunger reciprocable in said cylinder, said cylinder and plunger forming a working chamber, a discharge valve communicating with said working chamber and said conduit means and openable by fuel moved by said plunger and held open by moving fuel en route from said working chamber to said conduit means during fuel pumping by said plunger, said plunger having a normal stroke in fuel pumping direction terminating short of said discharge valve but of such length that maintenance of said discharge valve open ceases before the end of such normal pumping stroke, a source of fuel, means for supplying fuel from said source to the working chamber of said pump for pumping by said plunger to said fluid conduit means and for establishing a connection between said working chamber and said fuel source not later than the end of the normal working stroke of said plunger, means for effecting reciprocation of said plunger with a stroke varying in length with variations in travel of said piston, and means for effecting a renewed connection between said conduit means and said working chamber, in the event of substantial overtravel of said plunger in fuel pumping direction, while such overtravel is taking place.

2. An internal combustion engine having a combustion chamber and a piston movable in said combustion chamber with variable travel, conduit means through which fuel is conducted en route to said combustion chamber, a fuel pump connected to discharge fuel to said conduit means, said fuel pump having a cylinder and a plunger reciprocable in said cylinder, said cylinder and plunger forming a working chamber, a discharge valve communicating with said working chamber and said conduit means and openable by fuel moved by said plunger and held open by moving fuel en route from said working chamber to said conduit means during fuel pumping by said plunger, said plunger having a normal stroke in fuel pumping direction terminating short of said discharge valve but of such length that maintenance of said discharge valve open ceases before the end of such normal pumping stroke, a source of fuel, means for supplying fuel from said source to the working chamber of said pump for pumping by said plunger to said fluid conduit means and for establishing a connection between said working chamber and said fuel source not later than the end of the normal working stroke of said plunger, means for effecting reciprocation of said plunger with a stroke varying in length with variations in travel of said piston, and means for effecting a renewed connection between said conduit means and said working chamber, in the event of substantial overtravel of said plunger in fuel pumping direction, while such overtravel is taking place, said last recited means including means deriving its actuation from said plunger for reopening said discharge valve.

3. An internal combustion engine having a combustion chamber and a piston movable in said combustion chamber with variable travel, conduit means through which fuel is conducted en route to said combustion chamber, a fuel pump connected to discharge fuel to said conduit means, said fuel pump having a cylinder and a plunger reciprocable in said cylinder, said cylinder and plunger forming a working chamber, a discharge valve communicating with said working chamber and said conduit means and openable by fuel moved by said plunger and held open by moving fuel en route from said working chamber to said conduit means during fuel pumping by said plunger, said plunger having a normal stroke in fuel pumping direction terminating short of said discharge valve but of such length that maintenance of said discharge valve open ceases before the end of such normal pumping stroke, a source of fuel, means for supplying fuel from said source to the working chamber of said pump for pumping by said plunger to said fluid conduit means and for establishing a connection between said working chamber and said fuel source not later than the end of the normal working stroke of said plunger, means for effecting reciprocation of said plunger with a stroke varying in length with variations in travel of said piston, and means for effecting a renewed connection between said conduit means and said working chamber, in the event of substantial overtravel of said plunger in fuel pumping direction, while such overtravel is taking place, said last mentioned means including a thrust element on said discharge valve actuated by overtravel of said plunger.

4. An internal combustion engine having a combustion chamber and a piston movable in said combustion chamber with variable travel, conduit means through which fuel is conducted en route to said combustion chamber, a fuel pump connected to discharge fuel to said conduit means, said fuel pump having a cylinder and a plunger reciprocable in said cylinder, said cylinder and plunger forming a working chamber, a discharge valve communicating with said working chamber and openable to connect the latter with said conduit means, said discharge valve openable by fuel moved by said plunger and held open by moving fluid en route from said working chamber to said conduit means during fuel pumping by said plunger, said plunger having a connection with said piston whereby its stroke in fuel pumping direction varies with piston stroke, said plunger operative on movement beyond a predetermined position in which fuel pumping thereby has ceased to effect opening of said discharge valve to engage said discharge valve and reopen the same to permit return of fuel from said conduit means to said working chamber.

5. An internal combustion engine having a combustion chamber and a piston movable in said combustion chamber with variable travel, conduit means through which fuel is conducted en route to said combustion chamber, a fuel pump connected to discharge fuel to said conduit means, said fuel pump having a cylinder and a plunger reciprocable in said cylinder, said cylinder and plunger forming a working chamber, a discharge valve communicating with said working chamber and openable to connect the latter with said conduit means, said discharge valve openable by fuel moved by said plunger and held open by moving fluid en route from said working chamber to said conduit means during fuel pumping by said plunger, said plunger having a connection with said piston whereby its stroke in fuel pumping direction varies with piston stroke, said plunger operative on movement through varying distances beyond a predetermined position corresponding to the minimum stroke of said piston at which the engine will remain in operation to effect opening of said discharge valve to permit return of fuel from said conduit means to said working chamber.

6. An internal combustion engine having a combustion chamber and a piston movable in said combustion chamber with variable travel, conduit means through which fuel is conducted en route to said combustion chamber, a fuel pump, said fuel pump having a cylinder and a plunger reciprocable in said cylinder, said cylinder and plunger forming a working chamber, a discharge valve communicating with said working chamber and openable by fuel moved by said plunger and held open by moving fluid en route from said working chamber during fuel pumping by said plunger, said plunger having a connection with said piston whereby its stroke in fuel pumping direction varies with piston stroke, means associated with said plunger for controlling the amount of pumped fluid into said conduit means in accordance with the load on the engine, said plunger operative on movement beyond a predetermined position in which fuel pumping thereby has ceased to effect opening of said discharge valve to engage and reopen the same to permit return of fuel from said conduit means to said working chamber.

7. An internal combustion engine having a combustion chamber and a piston movable in said combustion chamber with variable travel, conduit means through which fuel is conducted en route to said combustion chamber, a fuel pump, said fuel pump having a cylinder and a plunger reciprocable in said cylinder, said cylinder and plunger forming a working chamber, a discharge valve communicating with said working chamber and openable by fuel moved by said plunger and held open by moving fluid en route from said working chamber during fuel pumping by said plunger, said plunger having a connection with said piston whereby its stroke in fuel pumping direction varies with piston stroke, means associated with said plunger for controlling the amount of pumped fluid into said conduit means in accordance with the load on the engine, said plunger engageable with said discharge valve on movement beyond a "minimum" stroke position corresponding to the piston stroke at which the engine will just maintain operation to engage and reopen said discharge valve to permit return of fuel from said conduit means to said working chamber.

8. A fluid flow control device comprising, a housing having a cylinder and a plunger reciprocable in said cylinder, said cylinder and plunger forming a working chamber, a discharge valve communicating with said working chamber and openable by fluid moved by said plunger and held open by moving fluid en route from said working chamber during fluid pumping by said plunger, said plunger being operative upon movement beyond a predetermined position in which fluid pumping thereby has ceased to effect opening of said discharge valve to engage said discharge valve and reopen the same to permit return of fluid to said working chamber through said discharge valve.

9. A fluid flow control device comprising a housing having a chamber therein, a plunger mounted in said chamber having an end portion movable in a forward path towards a surface of said chamber, means for admitting fluid to said chamber whereby said forward movement of said plunger increases the pressure of the fluid located in the portion of said chamber between said end portion of said plunger and said surface of said chamber, a normally closed discharge valve communicating with said chamber portion to be movable in one direction in response to said increased pressure to an open position to permit discharge of fluid from said portion of said chamber, means communicating with said chamber portion to release said increased pressure in said chamber portion after an intermediate portion of said forward path of said plunger has been traversed whereby said valve can close, and means actuated by said plunger upon movement of said plunger beyond said intermediate portion to cause movement of said discharge valve in said one direction.

10. A fluid flow control device comprising a housing having a chamber therein, a plunger mounted in said chamber having an end portion movable in a forward path towards a surface of said chamber, means for admitting fluid to said chamber whereby said forward movement of said plunger increases the pressure of the fluid located in the portion of said chamber between said end portion of said plunger and said surface of said chamber, a normally closed discharge valve communicating with said chamber portion to be movable in one direction in response to said increased pressure to an open position to permit discharge of fluid from said portion of said chamber, means communicating with said chamber portion to release said increased pressure in said chamber portion after an intermediate portion of said forward path of said plunger has been traversed whereby said valve can close, and engageable means on said discharge valve engageable with said plunger upon movement of said plunger beyond said intermediate portion to cause movement of said discharge valve in said one direction.

11. A fluid flow control device comprising a housing having a chamber therein, a plunger mounted in said chamber having an end portion movable in a forward path towards a surface of said chamber, means for admitting fluid to said chamber whereby said forward movement of said plunger increases the pressure of the fluid located in the portion of said chamber between said end portion of said plunger and said surface of said chamber, a normally closed discharge valve communicating with said chamber portion to be movable in one direction in response to said increased pressure to an open position to permit discharge of fluid from said portion of said chamber, said plunger having a passageway extending from said end portion thereof which is registerable with said means for admitting fluid to release said increased pressure in said chamber portion after an intermediate portion of said forward path of said plunger has been traversed whereby said valve can close, and means actuated by said plunger upon movement of said plunger beyond said intermediate portion to cause movement of said discharge valve in said one direction.

12. A fluid flow control device comprising a housing having a chamber therein, a plunger mounted in said chamber having an end portion movable in a forward path towards a surface of said chamber, means for admitting fluid to said chamber whereby said forward movement of said plunger increases the pressure of the fluid located in the portion of said chamber between said end portion of said plunger and said surface of said chamber, a normally closed discharge valve communicating with said chamber portion to be movable in one direction in response to said increased pressure to an open position to permit discharge of fluid from said portion of said chamber, means communicating with said chamber portion to release said increased pressure in said chamber portion after an intermediate portion of said forward path of said plunger has been traversed whereby said valve can close, and means on said discharge valve engageable with said end of said plunger upon movement of said plunger beyond said intermediate portion to cause movement of said discharge valve in said one direction.

13. A fluid flow control device comprising a housing having a cylinder therein, a plunger mounted in said cylinder having an end portion movable in a forward path towards one end of said cylinder, means for admitting fluid to said cylinder whereby said forward movement of said plunger increases the pressure of the fluid located in a chamber portion between said end portion of said plunger and said one end of said cylinder, a discharge valve biased to normally close said one end of said cylinder and communicating with said chamber portion to be movable in response to said increased pressure to an open position to permit discharge of fluid from said chamber portion, means communicating with said chamber portion to release said increased pressure in said chamber portion after an intermediate portion of said forward path of said plunger has been traversed whereby said valve can close, and means actuated by said plunger upon movement of said plunger beyond said intermediate portion to overcome the bias of said discharge valve.

14. A fluid flow control device comprising a housing having a chamber therein, a plunger mounted in said chamber having an end portion movable in a forward path towards a surface of said chamber, means for admitting fluid to said chamber whereby said forward movement of said plunger increases the pressure of the fluid located in the portion of said chamber between said end portion of said plunger and said surface of said chamber, a normally closed discharge valve located in a passageway extending from said chamber portion to be movable in response to said increased pressure to an open position to permit discharge of fluid from said chamber portion to a storage means connected to said passageway intermediate its length, another passageway extending from said chamber portion having a control means therein for opening and closing said first mentioned passageway at a location remote from said chamber portion and said storage means, said control means being responsive to said increased pressure in said chamber portion to close said first mentioned passageway, means communicating with said chamber portion for relieving said increased pressure in said chamber portion upon predetermined movement of said forward movement of said plunger whereby said control means opens said first mentioned passageway and said discharge valve can close, and means actuated by said plunger upon said forward movement of said plunger beyond said predetermined movement to move said valve into an open position whereby fluid can flow from said storage means to said chamber portion.

15. A fluid flow control device comprising a housing having a chamber therein, a plunger mounted in said chamber having an end portion movable in a forward path towards a surface of said chamber, means for admitting fluid to said chamber whereby said forward movement of said plunger increases the pressure of the fluid located in the portion of said chamber between said end portion of said plunger and said surface of said chamber, a normally closed discharge valve located in a passageway extending from said chamber portion to be movable in response to said increased pressure to an open position to permit discharge of fluid from said chamber portion to a storage means connected to said passageway intermediate its length, said storage means including means for maintaining fluid stored therein at an increased pressure, another passageway extending from said chamber portion having a control means therein for opening and closing said first mentioned passageway at a location remote from said chamber portion and said storage means, said control means being responsive to said increased pressure in said chamber portion to close said first mentioned passageway, means communicating with said chamber portion for relieving said increased pressure in said chamber portion upon predetermined movement of said forward movement of said plunger whereby said control means opens said first mentioned passageway and said discharge valve can close, and means actuated by said forward plunger upon said forward movement of said plunger beyond said predetermined movement to move said valve into an open position whereby fluid can flow from said storage means to said chamber portion.

16. A fluid flow control device comprising a housing having a chamber therein, a plunger mounted in said chamber having an end portion movable in a variable forward path towards a surface of said chamber, means for admitting fluid to said chamber whereby said forward movement of said plunger increases the pressure of the fluid located in the portion of said chamber between said end portion of said plunger and said surface of said chamber, a normally closed discharge valve communicating with said chamber portion to be movable in response to said increased pressure to an open position to permit discharge of fluid from said chamber portion to another chamber, a passageway extending from said other chamber and terminating with an opening in said path at a location remote from said surface of said first mentioned chamber, a relief passageway in said housing terminating with an opening in said path spaced from said first mentioned opening and means on said plunger spaced from said end portion for hydraulically connecting various increasing portions of said first mentioned opening with said last mentioned opening after an intermediate portion of said forward path of said plunger has been traversed.

17. A fluid flow control device comprising a housing having an elongated cylinder therein, an elongated plunger mounted in said cylinder with one of its ends movable in a variable forward path towards one end of said cylinder, means for admitting fluid at a low pressure to a chamber between said one ends whereby said forward movement of said plunger increases the pressure of the fluid located in said chamber, a normally closed discharge valve communicating with said chamber to be movable in response to said increased pressure to an open position to permit discharge of fluid from said chamber to another chamber in said housing, a passageway extending from said other chamber and terminating with an opening in said path at a location remote from said one end of said first mentioned chamber, a port in said housing spaced from said first mentioned chamber and extending from the surface of said cylinder to a low pressure volume, and said plunger having an annular passageway on its outer surface spaced from said one end to hydraulically connect various increasing portions of said opening to said port after an intermediate portion of said forward path has been traversed.

18. An internal combustion engine having a combustion chamber and a piston movable in said combustion chamber, a fuel pump connected to discharge variable quantities of fuel to said combustion chamber whereby said piston has a variable stroke, said fuel pump having a cylinder and a plunger reciprocable in said cylinder, said cylinder and plunger forming a working chamber, a discharge valve communicating with said working chamber and openable to connect the latter with said combustion chamber, said discharge valve openable by fuel moved by said plunger and held open by moving fluid en route from said working chamber to said combustion chamber during fuel pumping by said plunger, said plunger having a connection with said piston whereby its stroke in fuel pumping direction varies with variations in said piston stroke, said plunger operative on movement beyond a predetermined position to engage said discharge valve to permit return of variable quantities of fuel to said working chamber.

References Cited in the file of this patent

UNITED STATES PATENTS

| 1,596,194 | Lang | Aug. 17, 1926 |
| 1,883,980 | Lang | Oct. 25, 1932 |
| 2,090,709 | Steiner | Aug. 24, 1937 |
| 2,090,781 | Camner | Aug. 24, 1937 |
| 2,435,970 | Lewis | Feb. 17, 1948 |
| 2,473,204 | Huber | June 14, 1949 |